United States Patent

Chadwick

[15] 3,635,699

[45] Jan. 18, 1972

[54] METHOD OF PRODUCING SIZED PARTICLES OF LOW-CARBON FERROCHROMIUM

[72] Inventor: Cecil G. Chadwick, Lewiston, N.Y.

[73] Assignee: Union Carbide Corporation, New York, N.Y.

[22] Filed: Dec. 22, 1969

[21] Appl. No.: 887,340

[52] U.S. Cl. .............................75/130.5, 75/0.5 BA, 75/24, 75/101

[51] Int. Cl. ....................C22c 33/00, C22c 35/00, B22f 9/00

[58] Field of Search ......................75/130.5, 0.5 BA, 24, 101

[56] References Cited

UNITED STATES PATENTS

| | | | |
|---|---|---|---|
| 2,206,711 | 7/1940 | Udy | 75/130.5 |
| 2,473,019 | 6/1949 | Erasmus | 75/130.5 X |
| 2,473,021 | 6/1949 | Spendelow, Jr. et al. | 75/130.5 X |
| 2,541,153 | 2/1951 | Chadwick | 75/0.5 BA |
| 3,459,542 | 8/1969 | Knight | 75/130.5 |

*Primary Examiner*—L. Dewayne Rutledge
*Assistant Examiner*—G. K. White
*Attorney*—Paul A. Rose, Robert C. Cummings and Frederick J. McCarthy, Jr.

[57] ABSTRACT

Method for producing sized particles of high-purity low-carbon ferrochromium by heating under vacuum an agglomerated mixture of finely divided high-carbon ferrochromium, oxidized ferrochromium containing sufficient oxygen to react with the carbon in the high-carbon ferrochromium, and a slag-forming material such as silica whereby a reaction product is obtained comprising low-carbon ferrochromium in a matrix of slag. The agglomerated reaction product thus produced is crushed and the crushed material given a leaching treatment to remove the slag constituent.

4 Claims, No Drawings

METHOD OF PRODUCING SIZED PARTICLES OF LOW-CARBON FERROCHROMIUM

This invention relates to the production of finely sized, high-purity low-carbon ferrochromium. More particularly the present invention is directed to a method for efficiently sizing low carbon ferrochromium produced by the reaction in vacuum of high carbon ferrochromium and oxidized ferrochromium.

Low carbon ferrochromium is an important alloying material extensively used in the production of stainless steels. This material is commercially produced by either of two general techniques, i.e., by the electric furnace smelting of chrome ore and reaction with silicon reducing agents whereby low-carbon ferrochrome is obtained in the form of relatively large dense lumps of metal, or by the vacuum furnacing of agglomerated mixtures of high carbon ferrochrome and oxidant whereby the product is obtained in the form of briquettes.

While the bulk materials aforedescribed, i.e., lumps and briquettes, are effective as addition agents in the manufacture of steel, there is a definite need for a finely sized high-purity, low carbon ferrochrome for use in the manufacture of welding rods and in chromizing and other operations.

It is therefore an object of the present invention to provide a method for readily producing sized particles of high-purity, low carbon ferrochromium.

Other objects will be apparent from the following descriptions and claims.

A method in accordance with the present invention broadly comprises heating under vacuum conditions at elevated temperatures an agglomerated mixture of finely divided high carbon ferrochromium, finely divided oxidized ferrochromium, the oxygen content of the oxidized ferrochromium and a slag-forming material in the form of silica. The high carbon ferrochrome and oxidized ferrochrome react to provide an agglomerated reaction product comprising fine particles of low carbon ferrochromium in a matrix of slag; this material is readily crushable and is particulated to a desired size and leached to remove the slag constituent. The ease of crushing to fine particle size is enchanced as the silica addition is increased.

It has been discovered, as part of the present invention that when a mixture of high carbon ferrochromium and oxidized ferrochromium in proportions sufficient to decarbonize the high carbon ferrochromium and produce low carbon ferrochromium, has incorporated therein from about 0.5 to 10 percent by weight of silica, the silica constituent does not participate in the decarbonizing reaction but instead fuses and forms a glassy matrix substantially surrounding grains of low carbon ferrochromium reaction product. Low carbon ferrochromium in this form is readily crushable by standard crushing techniques and the silica slag constituent can be removed by leaching whereby a sized low carbon ferrochromium material is obtained. Further, since the silica slag-forming material does not participate in the decarbonizing reaction of a very high purity ferrochrome product is obtained. That is, the silicon content of the product material is not increased and it has been found that the sulfur content of the product is also surprisingly reduced. A silica content in an amount of from about 0.5 to 10 percent is effective in the present invention as previously noted; however from about 3 to 6 percent of silica is preferred since a remarkable improvement in crushability is found at this level. Optimum crushability has been found at a 4 percent silica content.

In the practice of the present invention a blended mixture of finely divided high carbon ferrochromium, e.g., sized 300 mesh and finer and oxidized ferrochromium, e.g., also sized 300 mesh and finer is prepared by conventional techniques. The composition of the high carbon ferrochromium ranges from about 65–75% Cr, 5–6% C, up to 2% Si, balance Fe and the oxidized high carbon ferrochromium has a composition of about 50% Cr, 26–30% $O_2$, less than 0.5% C, balance Fe. The amount of oxidized ferrochromium in the mixture is such that the oxygen content thereof is sufficient to react with the carbon of the high carbon ferrochromium. In the mixture as aforedescribed is incorporated from about 0.5 to 10 percent by weight of finely divided silica, e.g., from sized 60 to 300 mesh and finer.

The resulting mix is then agglomerated for example in the form of briquettes. The agglomerating procedure is conventional and can involve forming in a roll-type press using a suitable binder. The agglomerates are heated under vacuum conditions at a temperature and for a time sufficient to effect reaction between the oxygen of the oxidized ferrochromium and the carbon of the high carbon ferrochromium to produce low carbon ferrochromium in the form of agglomerated grains of metal. In general temperatures of from 1,200° C. to 1,400° C. and pressures of 100 microns to 1,000 are satisfactory.

In the course of the reaction between the oxidant and high carbon ferrochromium, the silica constituent remains chemically unaffected and fuses to provide a slag matrix for the grains of low carbon ferrochromium in the agglomerated reaction product.

This material is then subjected to crushing to obtain a desired particle size, and the crushed material is thereafter leached and the silica constituent removed. Suitable leaching materials are basic reactants such as NaOH and KOH.

The finely divided product obtained is of very low silicon content and is essentially silica-free, low carbon ferrochromium material in the finely divided state.

An important aspect of the leaching procedure is that a desliming and decantation procedure is employed. That is, the crushed material is digested in the leach solution and the very fine particles are "floated off" and the leach solution decanted. With this procedure a practically slag-free final product is obtained. On the other hand, if ordinary filtration techniques are employed, the slag impurity content of the material is quite high, e.g., on the order of several percent.

The following examples will further illustrate the present invention.

EXAMPLE I

Finely divided high carbon ferrochromium sized 300 mesh and finer in the amount of 75 parts having the following composition:

|    | % by Weight |
|----|-------------|
| Cr | 70.56       |
| Fe | 20.98       |
| C  | 5.42        |
| S  | 0.074       |
| Si | 1.10        | and 25 parts of oxidized ferrochromium (52.51% Cr, 17.04% Fe, 26.00% $O_2$) sized 300 mesh and finer and 6 parts of silica also sized 300 mesh and finer were thoroughly mixed with 5 parts of binder and 6 parts of water and pressed into briquettes having dimensions of 1½"×1¾"×1".

The briquettes were dried and then heated in a vacuum furnace for 22 hours at a temperature in the range of 1,000° to 1,385° C. at a pressure of about 300 microns. The product obtained was in the form of briquettes with a silica matrix and had a composition as follows:

|       | % by Weight |
|-------|-------------|
| Cr    | 70.73       |
| Fe    | 19.80       |
| C     | 0.024       |
| S     | 0.048       |
| Si    | 3.75        |
| $SiO_2$ | 4.63      |

The briquettes were then subjected to crushing in accordance with the following procedure:

Twenty pounds of material sized 4 mesh were charged to a ball mill. After 1 hour 97 percent of the material was sized finer than 100 mesh and there was no flattening or flaking of the particles as is the case with a smelted low carbon ferrochrome material.

The material was leached with a 27 percent solution of NaOH by being boiled overnight in a 30 percent pulp ratio and then washed by desliming and decantation. This was followed by filtering and washing to remove caustic and then drying at 105° C.

The analysis of the material before and after leaching is shown below:

|  | Before Leaching | After leaching |
|---|---|---|
| Total Cr | 70.73 | 75.04 |
| Total Si | 3.75 | 1.62 |
| Metallic Si | 1.57 | 1.56 |
| $SiO_2$ | 4.63 | 0.14 |
| C | 0.024 | 0.054 |
| CaO | 0.027 | 0.01 |
| O | 2.9 | 0.25 |
| MgO | 0.32 | 0.15 |
| N | 0.011 | 0.011 |
| $Al_2O_3$ | 0.53 | 0.10 |
| S | 0.048 | 0.030 |

EXAMPLE II

The same procedure was followed as in example I except that a lesser amount of silica, about 2 percent, was incorporated in the mixture.

After milling to provide 97 percent of the material finer than 100 mesh in the same manner as in example I, the product was leached in a solution of NaOH with the following results:

|  | Before Leaching | After Leaching |
|---|---|---|
| Total Cr | 69.82 | 70.69 |
| Total Si | 1.74 | 1.22 |
| Metallic Si | 1.06 | 0.86 |
| $SiO_2$ | 1.45 | 0.77 |
| C | 0.02 | 0.034 |
| CaO | 0.28 | 0.17 |
| O | 1.4 | 0.83 |
| MgO | 0.22 | 0.10 |
| N | 0.037 | 0.028 |
| $Al_2O_3$ | 0.53 | 0.36 |
| S | 0.021 | 0.009 |

In addition to the foregoing the standard Bond Work Index was calculated for the materials of examples I and II were calculated.

The index for the material of example I was found to be on the order of 25 KWH/Ton and 39 KWH/Ton for the material of example II. The Work Index represents the energy requested to size the material and as can be seen, with increased silica in the material, less energy is required. A Work Index could not be calculated for smelted low carbon ferrochromium material since this material could not be sized to 100 mesh.

From the foregoing description it can be seen that the present invention provides a straightforward method of producing finely divided particles of high purity, low carbon ferrochromium.

The mesh sizes referred to herein are United States Screen Series.

What is claimed is:

1. In the art of manufacturing low carbon ferrochromium alloy by reacting under vacuum at elevated temperatures an agglomerated reaction mixture of finely divided high carbon ferrochromium with finely divided oxidized ferrochromium, the oxygen content of the oxidized ferrochromium being sufficient to react with the carbon of the ferrochromium, the improvement which comprises providing a minor proportion of silica material in said reaction mixture whereby low carbon ferrochromium is produced in a matrix of slag; crushing the low carbon ferrochromium material and leaching the crushed material to remove the silica.

2. A method in accordance with claim 1 wherein the amount of silica employed is from about 0.5 percent to 10 percent by weight of the reaction mixture.

3. A method in accordance with claim 1 wherein the silica is in an amount of from 3 to 6 percent by weight of the reaction mixture.

4. A method in accordance with claim 1 wherein the amount of silica is in an amount of about 4 percent by weight of the reaction mixture.

* * * * *